US006757732B1

(12) United States Patent
Sollee et al.

(10) Patent No.: US 6,757,732 B1
(45) Date of Patent: Jun. 29, 2004

(54) TEXT-BASED COMMUNICATIONS OVER A DATA NETWORK

(75) Inventors: Patrick N. Sollee, Richardson, TX (US); Christopher Haun, Richardson, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/527,097

(22) Filed: Mar. 16, 2000

(51) Int. Cl.[7] .................................................. G06F 15/16

(52) U.S. Cl. ........................ 709/227; 709/204; 709/227; 709/228; 709/230; 455/412; 455/466; 455/413; 455/557; 379/52; 379/114; 375/222; 704/201

(58) Field of Search ................................ 709/102, 207, 709/218, 230

(56) References Cited

U.S. PATENT DOCUMENTS

| | | | | |
|---|---|---|---|---|
| 5,818,836 | A | | 10/1998 | DuVal |
| 5,966,652 | A | * | 10/1999 | Coad et al. |
| 5,966,663 | A | * | 10/1999 | Gleason |
| 6,181,736 | B1 | * | 1/2001 | McLaughlin et al. |
| 6,226,680 | B1 | * | 5/2001 | Boucher et al. |
| 6,252,952 | B1 | * | 6/2001 | Kung et al. |
| 6,301,609 | B1 | * | 10/2001 | Aravamudan et al. |
| 6,360,252 | B1 | * | 3/2002 | Rudy et al. |
| 6,389,114 | B1 | * | 5/2002 | Dowens et al. |
| 6,470,181 | B1 | * | 10/2002 | Maxwell |
| 6,490,550 | B1 | * | 12/2002 | Hiri |

FOREIGN PATENT DOCUMENTS

| | | |
|---|---|---|
| WO | WO 98/45781 | 10/1998 |

OTHER PUBLICATIONS

U.S. patent application Ser. No. 09/307,356, *Telephony and Data Network Services at a Telephone*, pp. 1–113, Figures 1–6, filed May 7, 1999.

Steve Donovan, et al., *The SIP Info Method*, Internet Draft, pp. 1–7 (Jun. 1999).

Steve Donovan, *The SIP Info Method*, Internet Draft, pp. 1–10 (Feb. 2000).

Jon Crowcroft, *Comments About H.323 and SIP*, pp. 1–6, printed from web site http://www.cs.columbia.edu (Jan. 22, 1998).

(List continued on next page.)

*Primary Examiner*—Hosain Alam
*Assistant Examiner*—Young Won
(74) *Attorney, Agent, or Firm*—Trop, Pruner&Hu, P.C.

(57) ABSTRACT

A communications system (10) includes a packet-based data network (12) that is coupled to various network elements (14, 16, 18, 20, 22, and 34) that are capable of participating in audio-based call sessions over the data network (12). The audio-based call sessions may be defined according to a Session Initiation Protocol (SIP) or to another type of protocol (e.g., H. 323). The network elements (14, 18, 22, and 34) are also capable of participating in text-based chat sessions. Text messages exchanged in such text-based chat sessions are earned in messages that are defined according to the protocol for audio-based call sessions. In one example, such messages may be SIP Info messages. The SIP Info messages carrying the text messages may be communicated either during an established audio-based call session or outside of an audio-based call session. Using SIP (or another signal protocol) messages to carry the text messages allows such messages to be conveniently transported through a firewall system.

32 Claims, 12 Drawing Sheets

OTHER PUBLICATIONS

*Comparison of H.323 and SIP*, pp. 1–5, printed from web site http://www.cs.columbia.edu, dated at least as early as Feb. 3, 2000.

Information Sciences Institute, *Internet Protocol, DARPA Internet Program Protocol Specification*, RFC 791, pp. 1–48 (Sep. 1981).

J. Postel, *User Datagram Protocol*, RFC 768, pp. 1–3 (Aug. 1980).

M. Handley, et al., *SDP: Session Description Protocol*, RFC 2327, pp. 1–39 (Apr. 1998).

H. Schulzrinne, et al., *RTP: A Transport Protocol for Real–Time Applications*, RFC 1889, pp. 1–69 (Jan. 1996).

S. Deering, et al., *Internet Protocol, Version 6 (IPv6) Specification*, RFC 2460, pp. 1–36 (Dec. 1998).

M. Handley, et al., *SIP: Session Initiation Protocol*, RFC 2543, pp. 1–153 (Mar. 1999).

Adam Roach, *Event Notification in SIP*, Internet Draft, pp. 1–8 (Mar. 2000).

Scott Petrack, et al., *The Pint Service Protocol: Extensions to SIP and SDP for IP Access to Telephone Call Services*, Internet Draft, pp. 1–59 (Oct. 14, 1999).

Jiri Kuthan, *Sample Uses of SIP Info with Varying Reliability Needs*, Internet Draft, pp. 1–7 (Oct. 17, 1999).

Robert Sparks, et al., *SIP Telephony Service Examples with Call Flows*, Internet Draft, pp. 1–79 (Oct. 1999).

Ranum, et al., *Internet Firewalls Frequently Asked Questions*, pp. 1–22, printed from http://www.clark.net (May 26, 1998).

* cited by examiner

500

```
INFO sip:viking@minnesota.com SIP/2.0
Via: SIP/2.0/TCP 47.161.18.114:5050
To: sip:viking@minnesota.com
From: sip:packer@47.161.18.114
Call-ID: 384573630@47.161.18.114
CSeq: 1 INFO
Contact: <sip:packer@47.161.18.114>
Content-Type: application/vnd.nortelnetworks.info
Content-Length: 72

p=Chat
t=<FONT COLOR = BLACK>I am sending an instant message to Viking
```

```
SIP/2.0 200 OK
Via: SIP/2.0/TCP 47.161.18.114:5050
To: sip:viking@minnesota.com
From: sip:packer@47.161.18.114
Call-ID: 384573630@47.161.18.114
CSeq: 1 INFO
Content-Length: 0
```

FIG. 11

TEXT-BASED COMMUNICATIONS OVER A DATA NETWORK

BACKGROUND

The invention relates to text-based communications over a data network.

Packet-based data networks are widely used to link various types of network elements, such as personal computers, servers, gateways, network telephones, and so form. Data networks may include private networks (such as local area networks or wide area networks) and public networks (such as the Internet). Popular forms of communications between network elements across packet-based data networks include electronic mail, file transfer, web browsing, and other exchanges of digital data.

With the increased capacity and reliability of packet-based data networks, voice communications (including telephone calls, video conferencing, and so forth) over data networks have become possible. Voice communications over data networks are unlike voice communications in a circuit-switched network, such as a public switched telephone network (PSTN), which provides users with dedicated, end-to-end circuit connections for the duration of each call. Communications over data networks, such as IP (Internet Protocol) networks, are performed using packets or datagrams that are sent in busts from a source to one or more destination nodes. Voice data sent over a data network typically shares network bandwidth with conventional non-voice data (e.g., data associated with electronic mail, file transfer, web access, and other traffic).

Although voice communications over data networks are becoming more available, text-based communications such as electronic mail, instant messaging, and text chat continue to be popular forms of communications between users over data networks. In using electronic mail, there typically exists some delay in getting a response from a destination user. The delay includes the amount of time for the electronic mail message to get from the originating user to the destination user, the time a user takes to respond to the electronic mail message, and the time to propagate the response back to the originating user. A destination user may not be sitting at his or her station, or the user may decide not to respond to the electronic mail until some later time. The originating user does not receive any indication of this, typically having to wait for a response, which may come much later.

A more real-time mechanism of communicating between users is provided by text chat sessions or instant messaging. Bolt instant messaging and text chat sessions are communications services that allow two or more users to establish real-time communications sessions in which text messages may be exchanged on an interactive basis. Typically, to establish a text chat or instant messaging session, users may have to log on to a third party server, referred to as a chat server in some arrangements. Alternatively, text chat or instant messaging sessions are available between users that subscribe to the same service provider, which in effect provides the common server or servers for the users. Without a centralized server through which users are logged into, text chat or instant messaging sessions may not be available to some users.

Furthermore, many local networks are protected by firewall systems that prevent unauthorized access from a public network such as the Internet. As a result, a remote user may be unable to reach a user in a local area network protected by a firewall system to establish a text chat or instant messaging session.

A need thus exists for a more robust method and apparatus for text-based communications over data networks.

SUMMARY

In general, according to one embodiment, a method of providing a text-based chat session over a data network includes establishing an audio-based call session between at least two network elements over the data network, and exchanging a text-based chat message over the data network during the call session.

In general, according to another embodiment, a method of providing a text-based communications session over a data network includes creating one or more messages according to a protocol for establishing audio-based call sessions, receiving a user-entered text string, and providing the user-entered text string in the one or more messages. The one or more messages are then sent over the data network to a target network element.

Some embodiments of the invention may have one or more of the following advantages. A more flexible technique is provided for establishing text-based chat sessions over a data network. Such text-based chat sessions may occur within or outside an audio-based call session to provide for enhanced flexibility. In addition, by using a signaling path of an audio-based call session for the text-based chat session, additional call setups are not needed Further, the signaling path of the audio-based call session may also provide a path through a firewall system for the text-based chat session.

Other features and advantages will become apparent from the following description, from the drawings, and from the claims.

BRIEF DESCRIPTION OF THE DRAWINGS

FIGS. 10 and 11 illustrate formats of messages exchanged in the message flow of FIG. 9.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, even although reference is made to the Session Initiation Protocol (SIP) in the described embodiments, other embodiments may include other protocols for establishing real-time interactive call sessions over data networks.

Figure 1:
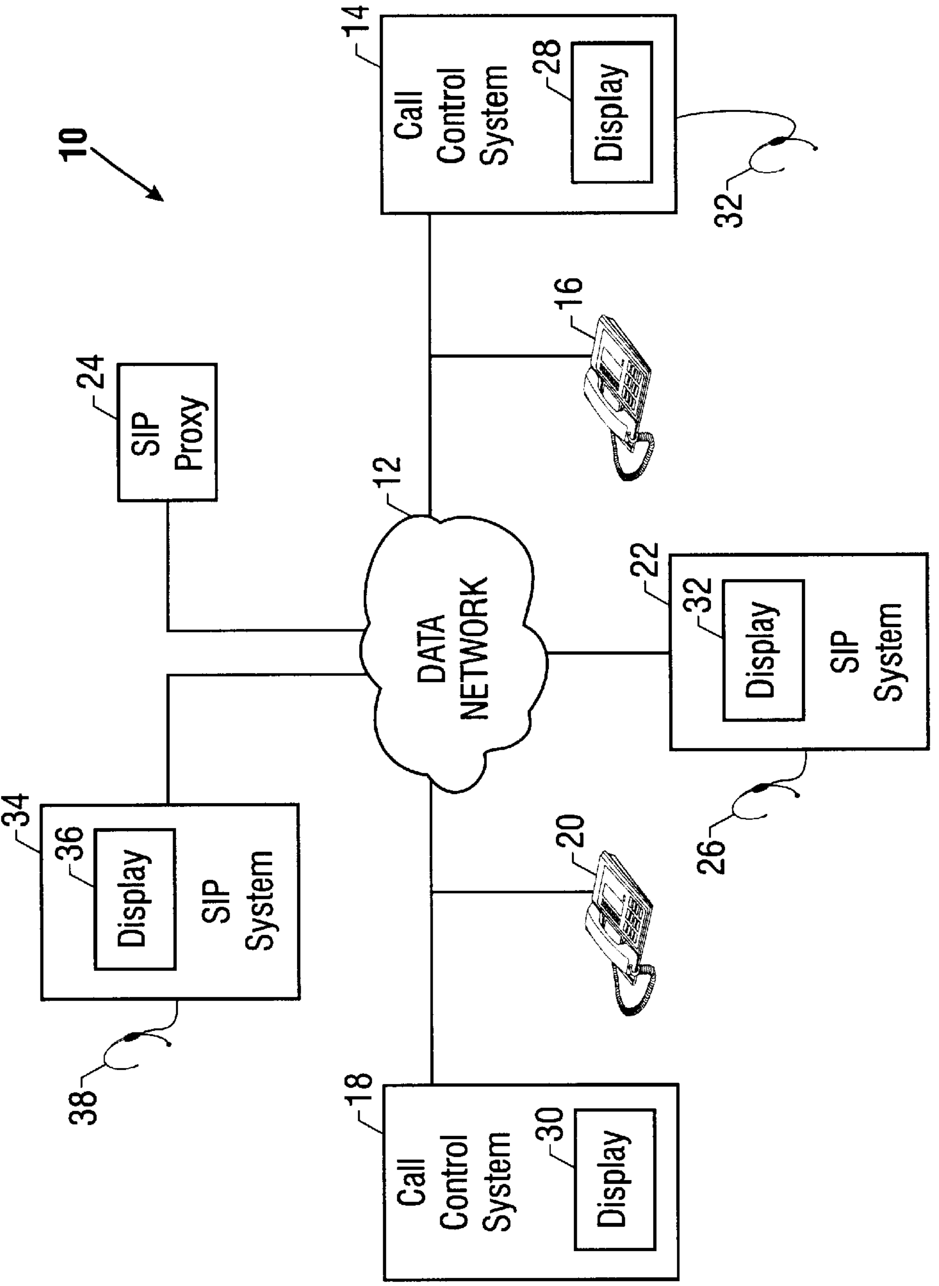
FIG. 1 is a block diagram of an embodiment of a communications system including a packet-based data network.

Referring to FIG. 1, a communications system 10 includes a packet-based data network 12 that is coupled to various network elements. The data network 12 may include a public network such as the Internet or private networks such as local area networks (LANs) or wide area networks (WANs). As used here a "data network" or "network" may refer to one or more communications networks, channels, links, or paths as well as systems or devices (such as routers or switches) used to route data over such networks, channels, links, or paths.

The network elements may include elements that are capable of participating in real-time interactive call sessions over the data network 12. In the example arrangement of FIG. 1, the network elements may include network telephones 16 and 20 and associated call control systems 14 and 18. The network elements may also include systems 22 and 34 that each includes call processing capabilities, including a headset 26 or 38, respectively, and components for performing audio processing.

The call control systems 14 and 18 behave as proxies for respective network telephones 16 and 20 to provide for generation of and responses to call control signaling over the data network 12 for establishing call sessions. Once a call session has been established by the call control system 14 or 18, the respective network telephone 16 or 20 participates in the communication of voice data (or other streaming data) over the data network 12 with the remote network element. The control path for the call session over the data network 12 goes through the call control system while the media path for the call session goes through the network telephone. The call control system is also capable of terminating the media pat In alternative embodiments, multiple network telephones may be associated with a single call control system. In yet other embodiments, the network telephones 16 and 20 may be functional units capable of operating on the data network 12 without the aid of call control systems 14 and 18.

A "call session" refers generally to either a text-based, audio-based (e.g., voice), or a multimedia (e.g., audio, video, and/or text) session established between two or more network elements coupled to the data network 12 (or any other packet-based data network). An "interactive" call session refers to a call session in which two or more parties are involved in an exchange of audio, video, and/or text data in an established session between two or more network elements. A "Seal-time" interactive call session refers to an exchange of data, such as audio, video and/or text data, on a substantially real-time basis between two terminals. A text-based interactive call session may be referred to as a "text-based chat session." In a real-time audio-based interactive call session, audio (such as voice) data is exchanged between participants of the call session. An audio-based call session may also include the communication of additional data, including video and/or text Thus, "real-time" communications refer to communications in which some interaction (in the form of exchange of text, audio, or video data) is occurring between two or more participants who have acknowledged each other's participation in the session, This is contrasted with electronic mail messaging, for example, in which a first participant sends a message over a data network to a second participant, usually with no acknowledgment or indication provided back to the first participant that the second participant has received the message or that the second participant is even at his or her terminal. In contrast, an interactive session involves a request followed by some acknowledgment that a called party has answered the call request (or not answered the call request) to enable the interactive session to be established in which participants exchange data (e.g., text, audio, and/or video).

In accordance with some embodiments, a text-based chat session may be established using messages defined according to a protocol for establishing audio-based interactive call sessions, such as a Session Initiation Protocol (SIP), H.323, or other protocol. Text strings that form text chat are inserted into such messages and carried over the data network 12 between two or more participating systems. A benefit of using an existing audio-based interactive call session protocol is that a predefined mechanism is already provided to invite members to a desired communications session. Also, use of an existing signaling system provides the routing needed to find a terminating party. In addition, a mechanism may be provided to go through firewall systems that may otherwise prevent a first user from establishing a session with a second user that is located behind a firewall system. A further benefit is that during an existing audio-based call session in which users are participating in voice communications, text-based chat messages may be sent along the same signaling path Tis provides the advantage of not having to open up additional ports or setting up additional communications sessions to send the desired text-based messages.

One example of the packet-based data network 12 may be an Internet Protocol (IP) network, which is a packet-switched networks One version of IP is described in Request for Comments (RFC) 791, entitled "Internet Protocol," dated September 1981. Other versions of IP, such as IPv6 or other connectionless, packet-switched standards may also be utilized in further embodiments. A version of IPv6 is described in RFC 2460, entitled "Internet Protocol, Version 6 (IPv6) Specification," dated December 1998. Packet-switched data networks such as IP networks communicate with packets, datagrams, or other units of data over the data networks. Unlike circuit-switched networks, which provide a dedicated end-to end connection or physical path for the duration of a call session, a packet-switched network is one in which the same path may be shared by several network elements. Packet-switched networks such as IP networks are based on a connectionless internetwork layer. Packets or other units of data injected into a packet-switched data network may travel independently over any path (and possibly over different paths) to a destination point The packets may even arrive out of order. Routing of the packets is based on one or more addresses carried in each packet.

The packet-based network 12 may also be connection-oriented, such as an ATM (Asynchronous Transfer Mode) network or a Frame Relay network. In a connection-oriented, packet-based network, a virtual circuit or connection is established between two end points. In such connection-oriented networks, packets are received in the same order in which they were transmitted.

The network elements coupled to the data network 12 may be capable of exchanging messaging to establish a SIP call sessions SIP is part of the multimedia data and control architecture from the Internet Engineering Task Force (IETF). A version of SIP is described in RFC 2543, entitled "SIP: Session Initiation Protocol," dated in 1999. SIP may be used to initiate call sessions as well as to invite members to a session that may have been advertised by some other mechanism, such as by electronic mail, news groups, web pages, and other mechanisms. The other protocols in the IETF multimedia and control architecture include the Resource Reservation Protocol (RSVP), as described in RFC 2205, for reserving network resources; the Real-Time Transport Protocol (RTP), as described in RFC 1889, for transporting real-time data and providing quality of service (QoS) feedback; the Real-Time Streaming Protocol (RTSP), as described in RFC 2326, for controlling delivery of streaming media; the Session Description Protocol (SDP), as described in RFC 2327, for describing multimedia sessions; and the Session Announcement Protocol (SAP) for advertising multimedia sessions by multicast.

Other standards may also be employed in further embodiments for controlling call sessions over the data network 12. Such other standards may be any other standard that provides for interactive, real-time audio or multimedia communications over the data network 12. One alternate standard is the B.323 Recommendation from the International Telecommunications Union (ITU).

Each of the network elements 14, 18, 22, and 34 in FIG. 1 may be referred to as SIP systems, which may be SIP clients or SIP servers. A SIP client system includes a client application program that is capable of sending SIP requests to perform call requests. A SIP server system includes an application program that accepts SIP requests to service calls and to send back responses to SIP requests The systems 14, 18, 22, and 34 may be SIP clients when originating call requests and SIP servers when accepting or responding to requests. The data network 12 may also be coupled to a network element 24 that behaves as a SIP proxy system, which may include an intermediary program hat acts as both a server and client for making requests on behalf of other clients. Thus, for example, the system may make a call request to the system 18 directly through the data network 12 (referred to as a peer-to-peer call session). Alternatively, the system 14 may go through the proxy system 24 to make the call to the system 18.

The network elements 14, 16, 18, 20, 22, and 34 are able to establish audio-based call sessions with each other, using SIP messaging in one example. In addition, each of the network elements are able to participate in text-based communications using SIP messages to carry the text strings that make up the text messages. The text strings carried by the SIP messages may be displayed on displays 28, 30, 32, and 36 of respective systems 14, 18, 22, and 34. The text-based messages may be exchanged during an established audio-based call session. Alternatively, the text-based messages may also be exchanged outside of an established call session, still using SIP messages to carry the text strings.

Figure 2:
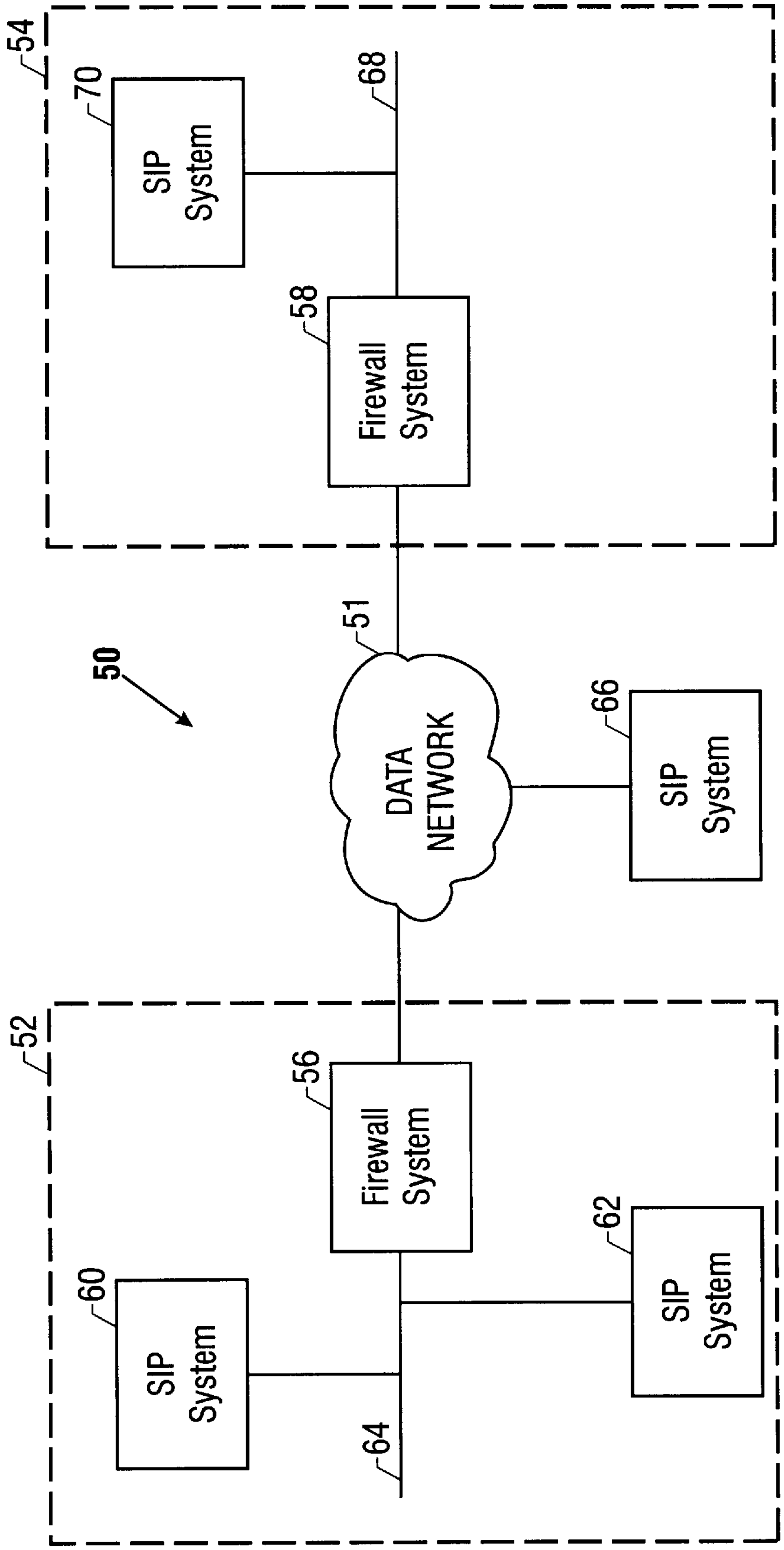
FIG. 2 is a block diagram of another embodiment of a communications system

Referring to FIG. 2, a communications system 50 having a different arrangement is illustrated. The communication system 50 includes a packet-based data network 51 coupled to communities 52 and 54. Each of the communities 52 and 54 includes a respective local network 64 or 68 that is protected from external unauthorized access by a respective firewall system 56 or 58. The firewall system 56 or 58 can perform logging and auditing tasks to determine whether data packets re permitted to pass through. Generally, users inside each community are permitted to freely communicate with the outside world, but the firewall system blocks incoming unauthorized traffic.

Terminals in the communication system 50 that can participate in audio-based and text-based communications over the data network 51 include SIP systems 60 and 62 (in the first community 52), SIP system 66 (coupled to the data network 12), and SIP system 70 (in the second community 54). To enable audio-based call sessions, such as SIP sessions, the firewall systems 56 and 58 are configured to pass (that is, not block) certain SIP messages passed through the firewall systems. To ensure integrity of the SIP messages, the firewall systems 56 and 58 may perform a validity check of the SIP messages to ensure that the SIP messages are valid based on the current state of an established call session. Also, the firewall system 56 or 58 may limit the acceptance of SIP messages from known sources. Encryption and authentication may be performed in the firewall systems 56 and 58 to ensure that external sources are indeed who or what they purport to be.

In addition to allowing audio-based call sessions through the firewall systems 56 and 58, text-based messages that are carried in SIP messages may also be passed through the firewall system 56 or 58. This provides a convenient mechanism through which text-based chat messages may be passed through a firewall system.

Although not shown, firewall systems may also be used in the communications system 10 of FIG. 1. In the ensuing discussion, "data network 12" refers to either data network 12 of FIG. 1 or data network 51 of FIG. 2.

Figure 3:
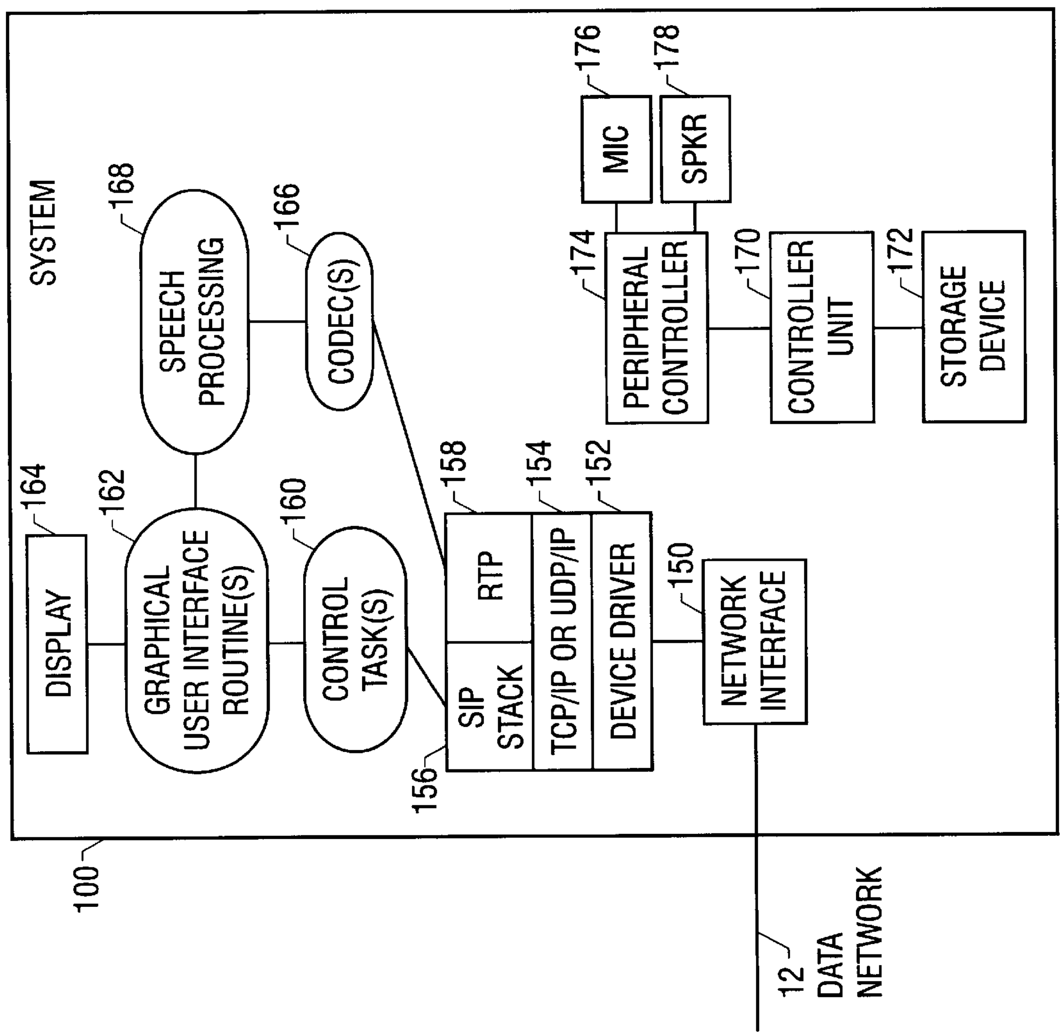
FIG. 3 illustrates components of a system in accordance with one embodiment for use in the communications system of FIG. 1 or 2.

Referring to FIG. 3, the components of the SIP systems and call control systems of FIG. 1 and 2 are illustrated in greater detail. Generally, one of such systems is referred to as a "system 100." The system 100 includes a network interface 150 that is coupled to the data network 12. Above the network interface 150 are several layers, including a device driver layer 152, a transport and network stack 154, a SIP stack 156, and an RTP layer 158. The transport and network stack 154 may include a TCP/IP or UDP/IP stack. TCP is described in RFC 793, entitled "Transmission Control Protocol," dated September 1981; and UDP is described in RFC 768, entitled "User Datagram Protocol." dated August 1980. TCP and UDP are transport layers for managing connections between network elements over an IP network.

The SIP stack 156 is responsible for processing or generating SIP requests and responses communicated over the data network 12. The SIP stack 156 is in communication with one or mote control tasks 160 in the system 100. The SIP stack 156 is generally a state machine that provides parsing, processing, and generation of SIP requests and responses.

The call control tasks 160 are responsible for generating control signaling for transmission to establish call sessions over the data network 12 as well as to respond to received control signaling. In addition, if the system 100 is a call control system (e.g., 14 or 18 in FIG. 1), the control tasks 160 are responsible for exchanging commands and responses with the network telephone 16 or 20 to establish such call sessions. The system 100 may include one or more graphical user interface (GUI) routines 162 that control the presentation of information (text or graphical) on a display 164 of the call control system. Further, the user interface provided by the GUI routines 162 may include selectors for call control and indicators of the status of a call session.

In the illustrated arrangement, the RTP layer 158 sends audio data to, or receives audio data from, an audio CODEC 166. The audio CODEC 166 encodes or decodes audio data. A speech processing routine 168 may perform further processing of voice data In further embodiments, the audio CODEC 166 and the speech processing routine 118 may be omitted. The various software routines in the call system 100, including the various layers 152, 154, 156, and 158 as well as the control tasks 160, CODECs 166, speech processing routine 168, and GUI routine 162, are executable on a control unit 170. The control unit 170 is coupled to a storage device 172 in which instructions and data associated with the various software routines may be stored.

In the illustrated example arrangement, to provide an audio user interface to a user sitting at the system 100, a peripheral controller 174 is coupled to a microphone 176 and a speaker 178 through which a user can talk or listen during a call session. The peripheral controller 174 may also be coupled to a headset.

Figure 4:
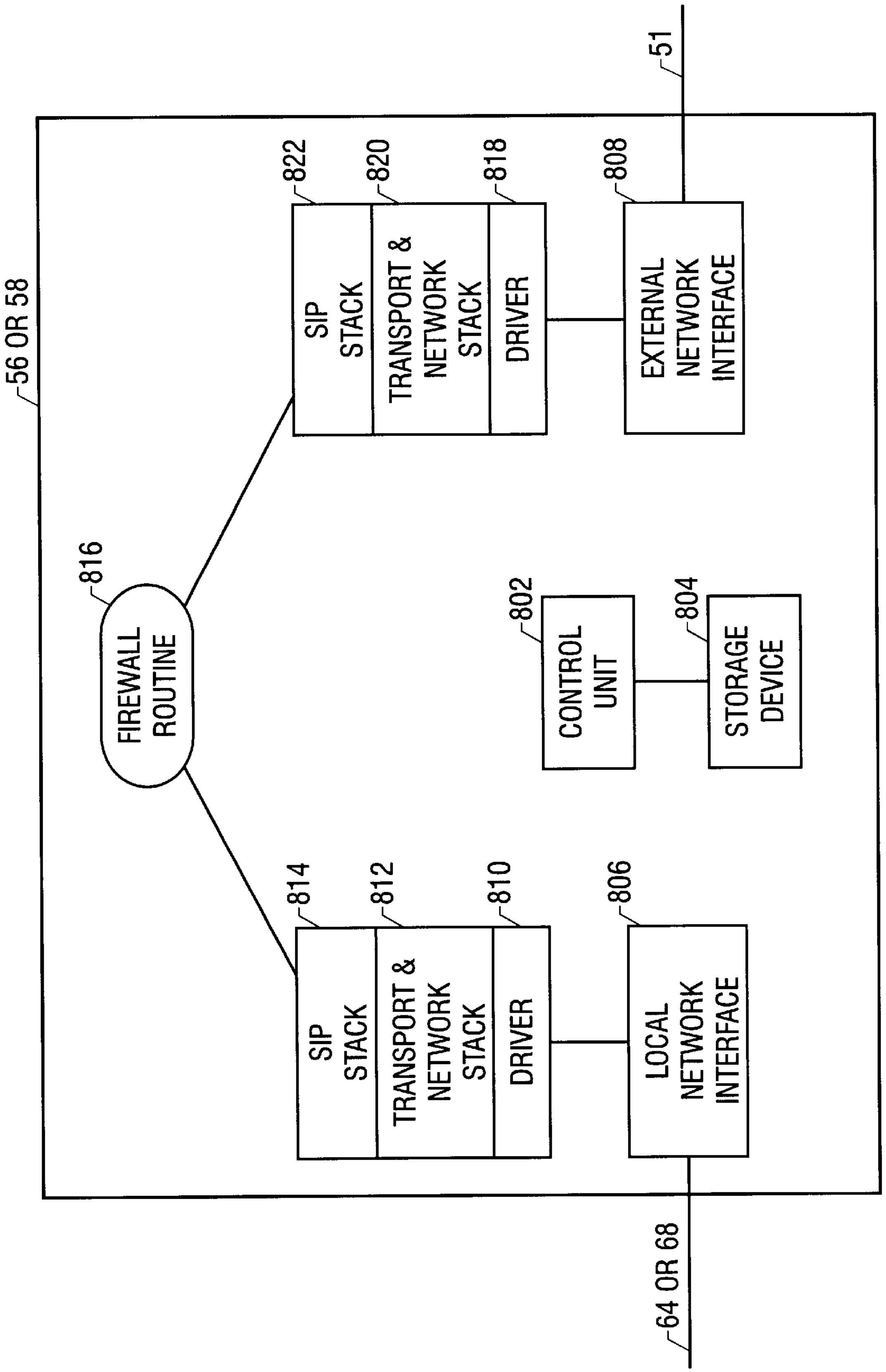
FIG. 4 illustrates components of a firewall system in accordance with an embodiment for use in the communications system of FIG. 1 or 2.

Referring to FIG. 4, the components of the firewall system 56 or 58 (FIG. 2) are illustrated. The firewall system 56 or 58 includes an external network interface 808 that is coupled to the external network 51 and a local network interface 806 that is coupled to the local network 64 or 68. Above the external network interface 808 are the driver layer 818, a transport and network stack layer 820, and a SIP stack 822. Similarly, above the local network interface 806 are a device driver layer 810, a transport and network stack 812, and a SIP stack 814. Packets communicated over the external network 51 are passed through the layers 818, 820, and 822, while packets Cat are communicated over the local network 64 or 68 are passed through the layers 810, 812, and 814. A firewall routine 816 is executable on a control unit 802 in the firewall system 56 or 58 to control transfer of data between the local network 64 or 68 and the external network 12. Instructions and data associated with the firewall routine 816 maybe stored in a storage device 804.

Figure 5:
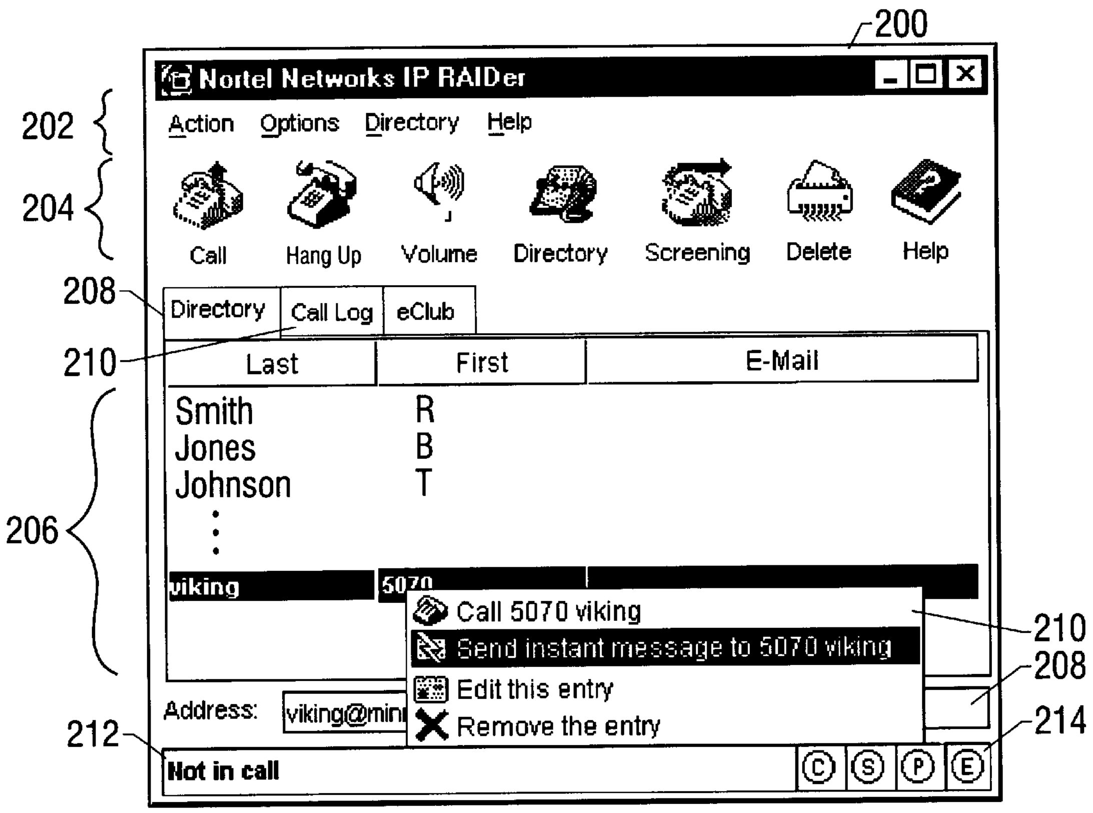
FIG. 5 illustrates a graphical user interface (GUI) screen for performing call control and instant messaging according to a first mode of operation.

Referring to FIG. 5, a call control graphical user interface (GUI) screen 200 that may be provided by GUI routines 162 in any one of the SIP systems of FIG. 1 or 2 is illustrated. The screen 200 includes various icons and items (generally referred to as selectors) to allow a user to initiate, terminate, and manage audio-based calls over the data network 12 as well as establish text-based chat sessions. In the example shown in FIG. 5, the screen 200 includes a menu 202, a row of control icons 204, and a directory list 206 under a Directory tab 208. A Call log tab 210, if selected, may display a log of incoming and outgoing calls (whether audio-based or text-based), The example directory list 206 provides the first and last names of potential callees as well as associated addresses, such as e-mail addresses. As illustrated in FIG. 5, the name "5070 Viking" may be highlighted in the directory list 206. The address of "5070 Viking" may be displayed in an address field 208, with the address in one of various formats, such as a PSTN number (e.g., 972-555-1234); combination of a PSTN number and a proxy address (e.g., 972-555-1234@ctxi300); an IP address (e.g., 47.161.18.72); a SIP address (e.g., 5070. Viking@nortelnetworks.com); a SIP address at a specific IP address (e.g., 5070. Viking@47.161.18.72); or other formats.

A status field 212 may also be included in the screen 200, which may show the status as "Not in call," "Outgoing call to 5070 Viking," "Incoming call from 5070 Viking," and so forth. A plurality of other indicators 214 may also be provided in the screen 200.

The screen 200 may also provide a pop-up menu 210 to allow a user to select one of several methods of contacting the desired callee. For example, a first option in the pop-up menu 210 is to "Call 5070 Viking," which causes messaging to be sent to establish an audio-based call session. Another option is to "Send an instant message to 5070 Viking." Other options may also be included such as sending an electronic mail message to 5070 Viking or going to 5070 Viking's web site (not shown).

Other call control operations that may be performed by a user with the screen 200 includes volume control, screening of incoming calls, accessing a directory list, and other operations.

In a first mode of operation, an audio-based call session, such as a call session according to SIP, does not need to be first established to perform text-based chat communications. As used here, such text-based chat communications performed outside of an established audio-based call session may also be referred to as "instant messaging" between two or more participants. As illustrated in the screen 200 of FIG. 5, an audio-based call session may be inactive, as indicated by the "Not in call" status in the status field 212. Even though an audio-based call session is not active, the option to send instant messaging to the desired callee (e.g., 5070 Viking) may be selected in the pop-up screen 210 to establish an instant messaging session with the remote system. An instant messaging session may also be referred to as an "out-of-band" text-based chat session, since it occurs outside of an established audio-based call session.

Figure 6:
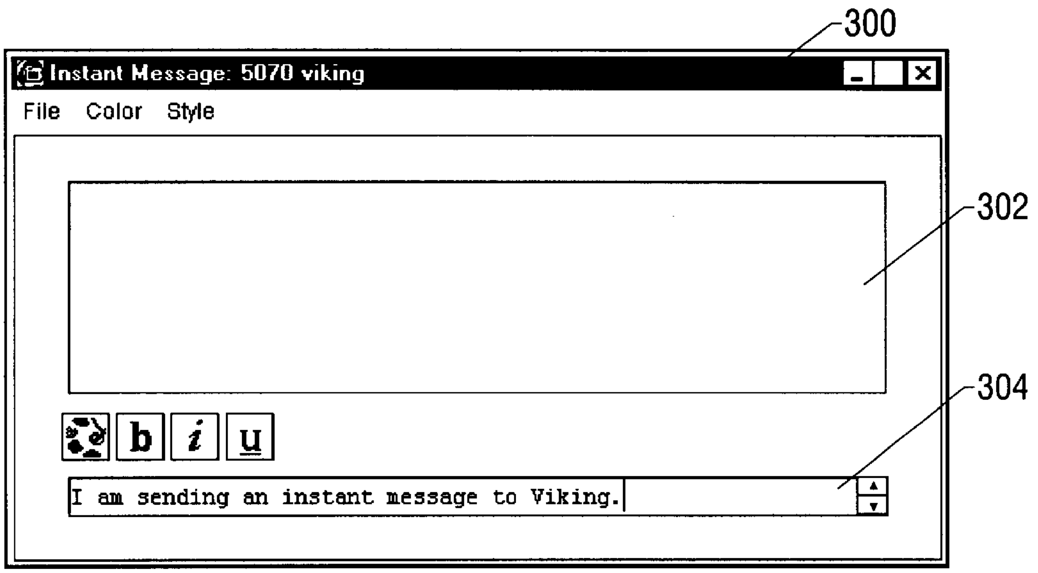
FIGS. 6–8 illustrate screens that are displayed at the originating and receiving ends in an instant messaging session according to the first mode of operation.

Referring further to FIG. 6, if the user selects the option to send an instant message to the desired callee (e.g., 5070 Viking), an instant messaging screen 300 may be created and displayed at the originating system. The instant messaging screen 300 includes an entry box 304 in which the originating (or first) user may type in a text string that the first user wishes to communicate to the destination (or second) user, in this example 5070 Viking. The instant messaging screen 300 also includes a display box 302 in which messages (from both the first and second users) are displayed Initially, as shown in FIG. 6, the display box 302 is empty.

When the first user hits a send key, which may be the enter key of a keyboard or a send button provided by a GUI screen, the screen 300 may disappear on the first user's display and the text message is sent to the second user. Alternatively, the screen 300 may remain active on the first user's display.

Figure 7:
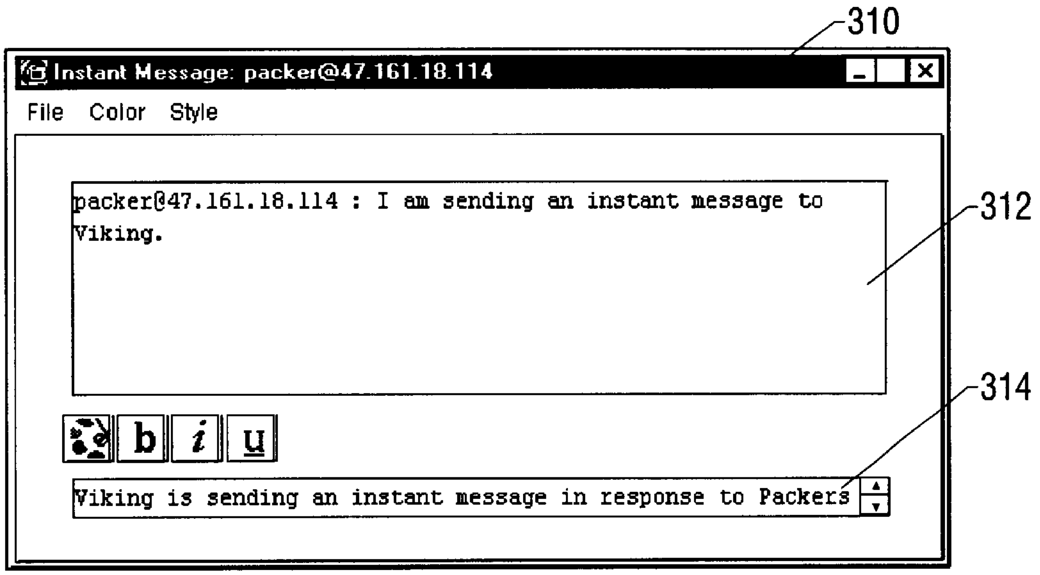
Figure 8:
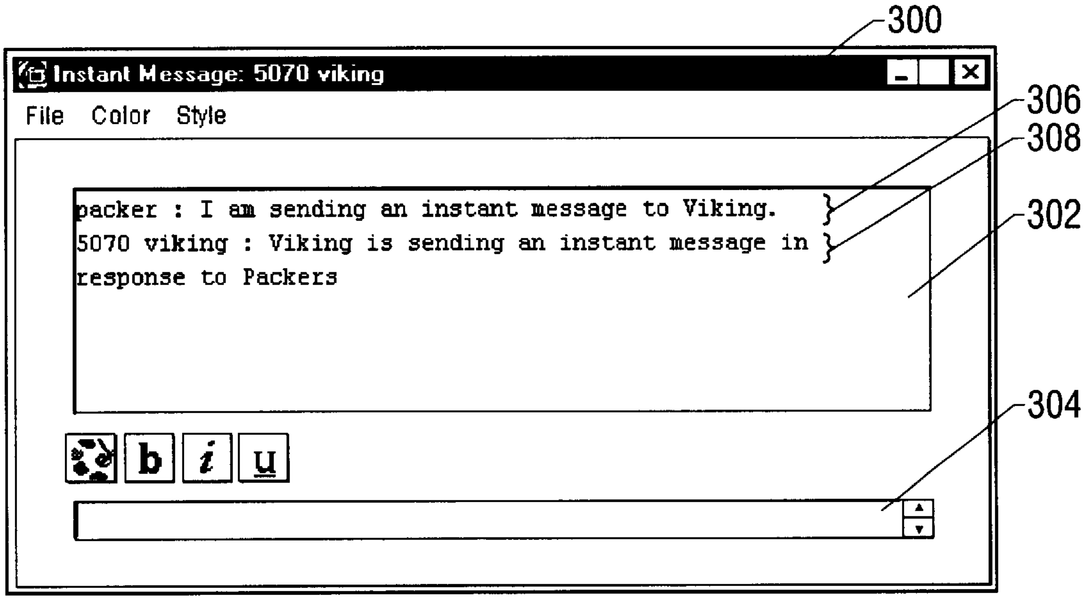

As shown in FIG. 7, at the receiving end, an instant messaging screen 310 pops up on the receiving system's display in response to receipt of the text message. The text message appears in the display box 312 of the screen 310. The display box 312 shows the identifier of the first user (e.g., packer@47.161.18.114) followed by the text message. In response, the second user may type in a text string in an entry box 314 of the screen 310, which may then be sent by the second user back to the first user. At the originating system, the screen 300 may then appear as in FIG. 8, in which a history of the instant messages is displayed in the display box 302. The message 306 of the first user appear first followed by the response message 308 of the second user. The communication of text messages may continue further between the first and second users.

Figure 9:
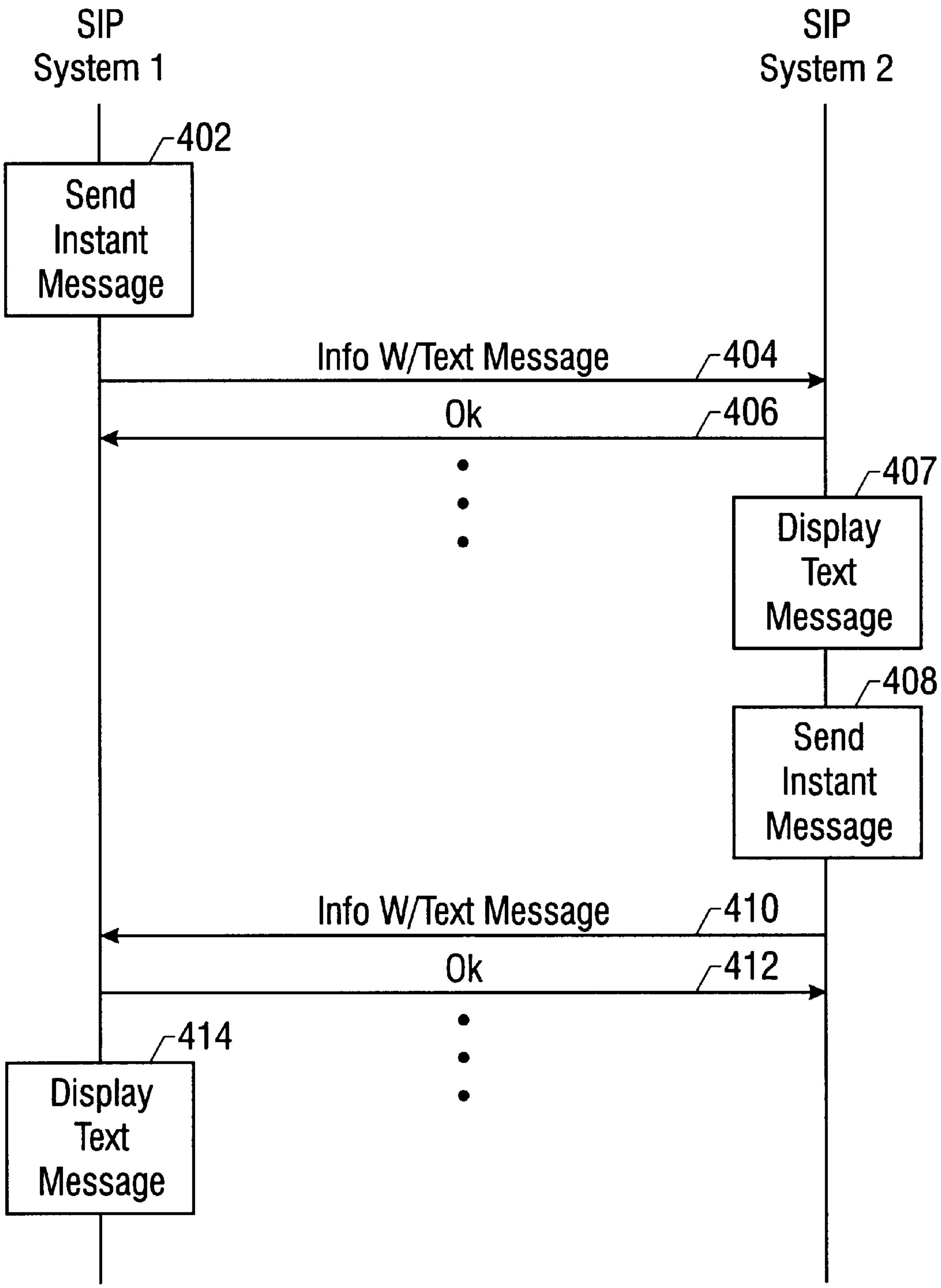
FIG. 9 is a message flow diagram illustrating the exchange of text messages between two systems according to the first mode of operation.

Referring to FIG. 9, a message flow diagram illustrates the exchange of messages, which may be according to SIP, between a first and a second SIP system which respective first and second users may be using. The first SIP system may be associated with the first user, while the second SIP system may be associated with th second user. Upon receiving a send instant message command (at 402) from the first user, the first SIP system creates a SIP Info message with the desired text string embedded within. The Info message is sent to the second SIP system (at 404). An Info message according to SIP may carry application level information inside or outside the signaling path of a SIP call session. In the example of FIG. 9, the Info message is sent outside the signaling path of an established call session, since a SIP call session may not have been established between the two SIP systems. The application level information may include the text string that makes up the text message to be communicated. The text message may also be carried in more than one Info message (especially if the text string may include large amounts of data).

Upon receipt of the Info message, the second SIP system may send a SIP OK response (at 406) back to the first SIP system. The first user's text message may then be displayed (at 407) on the second SIP system. In response to a command to send an instant message (at 408) from the second user, the second SIP system may send (at 410) an Info message with the text string of the second user's text message. The first SIP system then returns an OK response (at 412) after it receives the Info message and displays (at 414) the text message.

An example format of the Info message is illustrated in FIG. 10. The Info message may be formatted following the same convention as other SIP request messages, and may include the Via, To, From, Call-ID, CSeq, and Contact fields. The instant message text is placed in the message body of the Info message. The info message may also include the Content-Type and Content-Length fields. The Content-Type field identifies the type of the message, and the Content-Length field indicates the length of tie message body.

The message body 502 of the Info message 500 may also include two parameters "P" and "T". The "P" parameter stands for package-type, which may be set to the value "chat" for carrying text-bad chat data. The "T" parameter stands for text, which is the text message the user wishes to send. In the example shown, the text message embedded in the Info message may be in Hypertext Markup Language (HTML) format. Alternatively, the text message may be in ASCII format. In the example of FIG. 10, the message is "I am sending an instant message to Viking," and there may be a font indication in the form of "<font color=black>."

Referring to FIG. 11, a format of an example OK message 550 is illustrated. The OK message 550 includes the standard header information of a SIP response, including the Via, To, From, Call-ID, CSeq, and Content-Length fields. The CSeq field identifies the OK message 550 as one that is responding to an Info message.

Figure 12:
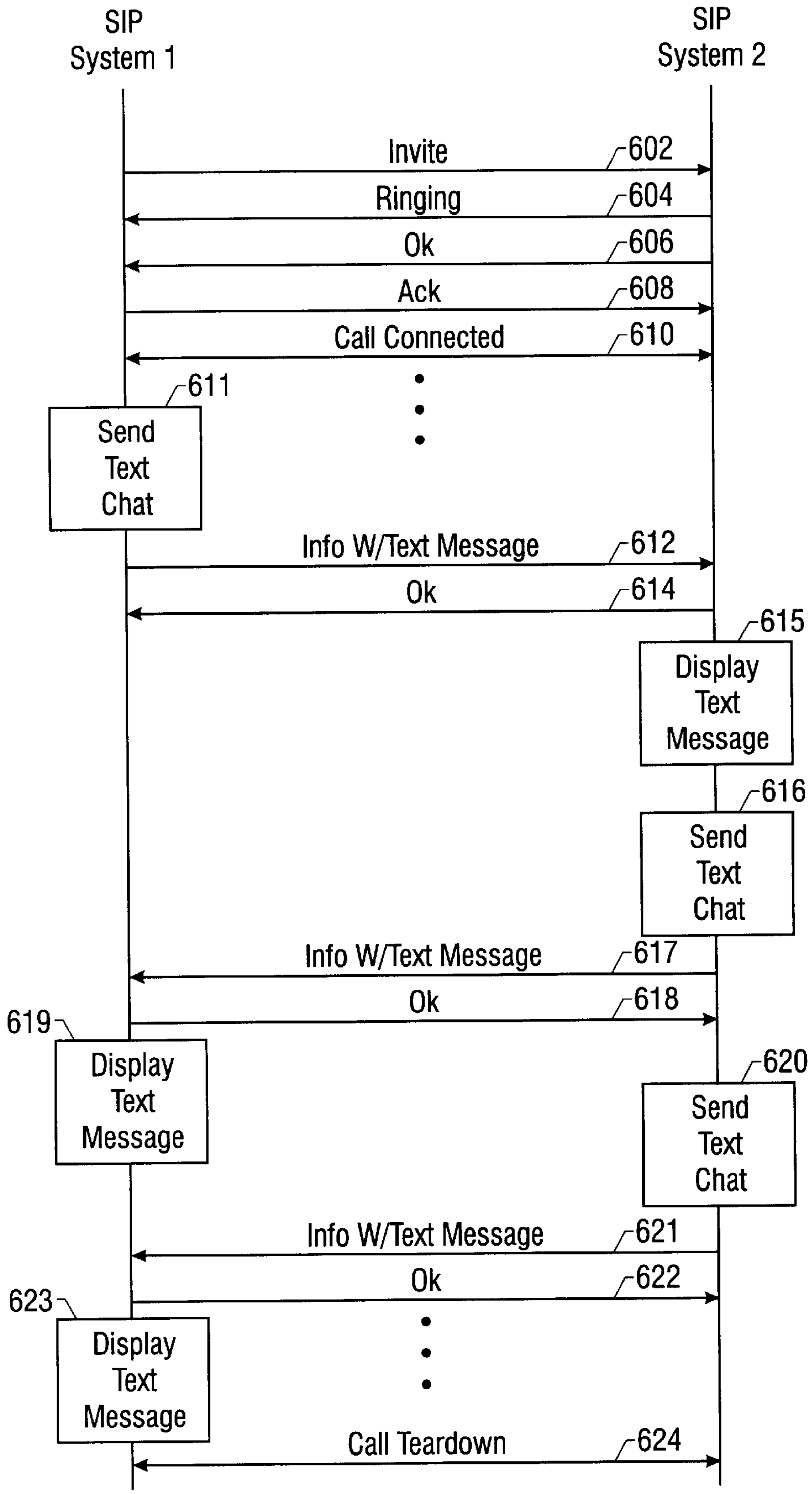
FIG. 12 is a message flow diagram of messages exchanged between two systems for establishing an audio-based call session and for exchanging text-based chat messages according to a second mode of operation.

Referring to FIG. 12, a message flow diagram for performing text-based communications according to a second mode of operation is illustrate. In the second mode of operation, text-based messages are communicated inside an audio-based call session. The text-based messages arc carried in SIP Info messages communicated along the signaling path of an established SIP session. As used here, a "signaling path" does not necessarily connote a physical circuit between two end points but rather generally refers to a path (which may be different at different times in a packet-based network) that is part of an established call session between the end points. The exchange of messages is between a first SIP system and a second SIP system. The first SIP system sends (at 602) an Invite request (according to SIP) to the second SIP system. The Invite request indicates that the receiving node is being invited to participate in a session. The message body of the Invite request contains a description (e.g., in SDP format) of the session to which the receiving node is being invited The second SIP system may then send (at 604) a SIP Ringing response back to the first SIP system. The Ringing response indicates that the called user agent has located a possible location where the user has registered recently and is trying to alert the user. Once the user at the second SIP system accepts the call, the second SIP system sends an OK response (at 606) back to the first SIP system to indicate that the request has succeeded. The first SIP system then sends (at 608) a SIP Ack request to the second SIP system to confirm that the first SIP system has received a final response to an Invite request. Next, an RTP setup may be performed, following which a call is connected (at 610) between the two SIP systems. The participants may then exchange audio or multimedia communications over the established RTP path.

The participants also have the option of exchanging text-based messages during the call session. To do so, SIP Info messages may be employed. As shown in FIG. 12, the first SIP system may send, in response to a user request (at 611), an Info message containing the text chat message (at 612) to the second SIP system. The second SIP system may return an OK response (at 614). The received text message is also displayed (at 615). The user at the second SIP system may respond to receipt of the text chat message by talking to the first user (over the RTP path), or alternatively, by returning a text message. Thus, in response to a request by the second user to send a text chat message (at 616), the second SIP system creates an Info message and sends (at 617) the Info message with the embedded text chat message to the first SIP system. The first SIP system then returns an OK response (at 618) and also displays (at 619) the received message. The user at the second SIP system may decide to send another text chat message, as indicated at 620, in which case the second SIP system transmits (at 621) another Info message with the embedded text chat message. The first SIP system returns an OK response (at 622) and displays (at 623) the text message. Finally, when the call session is over, a tear down procedure may be performed (at 624).

Figure 13:
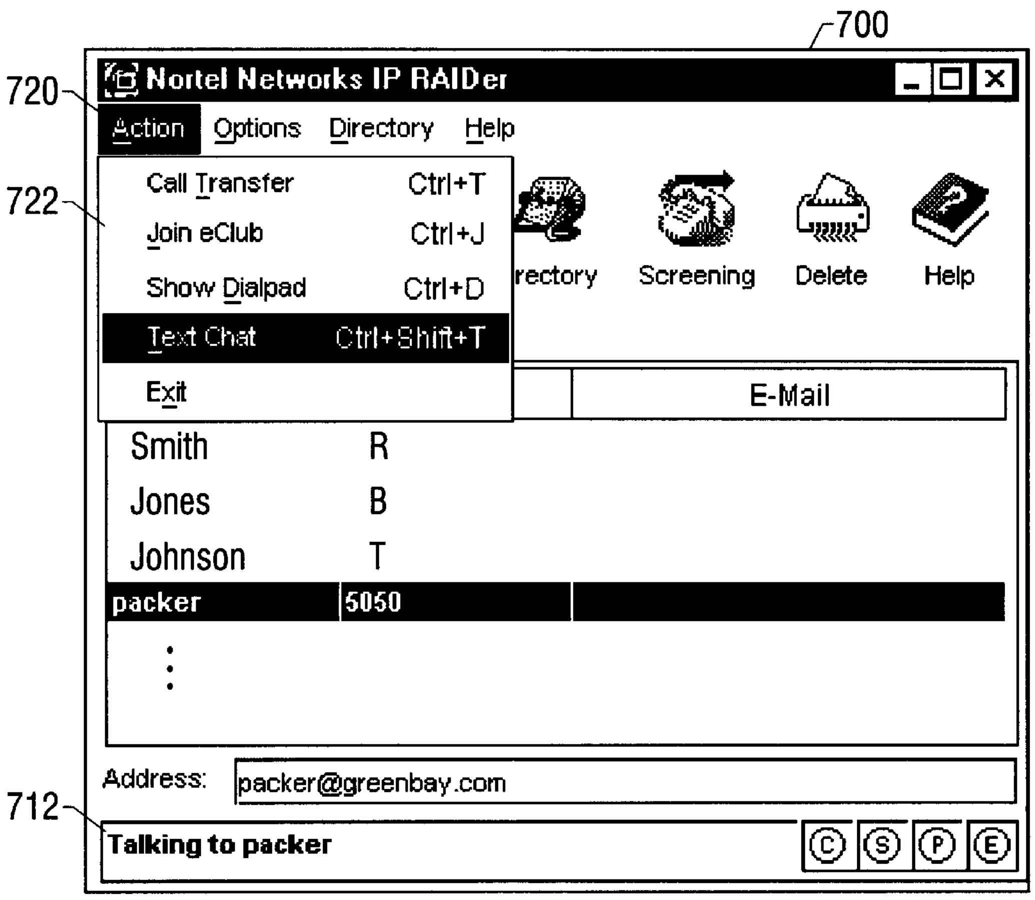
FIG. 13 illustrates a GUI screen for performing call control and text chat during an audio-based call session in the second mode of operation.

Referring to FIG. 13, a GUI screen 700 for performing text chat during a live audio-based call session is illustrated. A status box 712 in the screen 700 indicates that a call session is currently active with a called user (e.g., 5050 Packer). Upon selecting the Action file menu 720, several actions are listed in a pop-up menu 722. One of the actions includes sending a text chat message.

Figure 14:
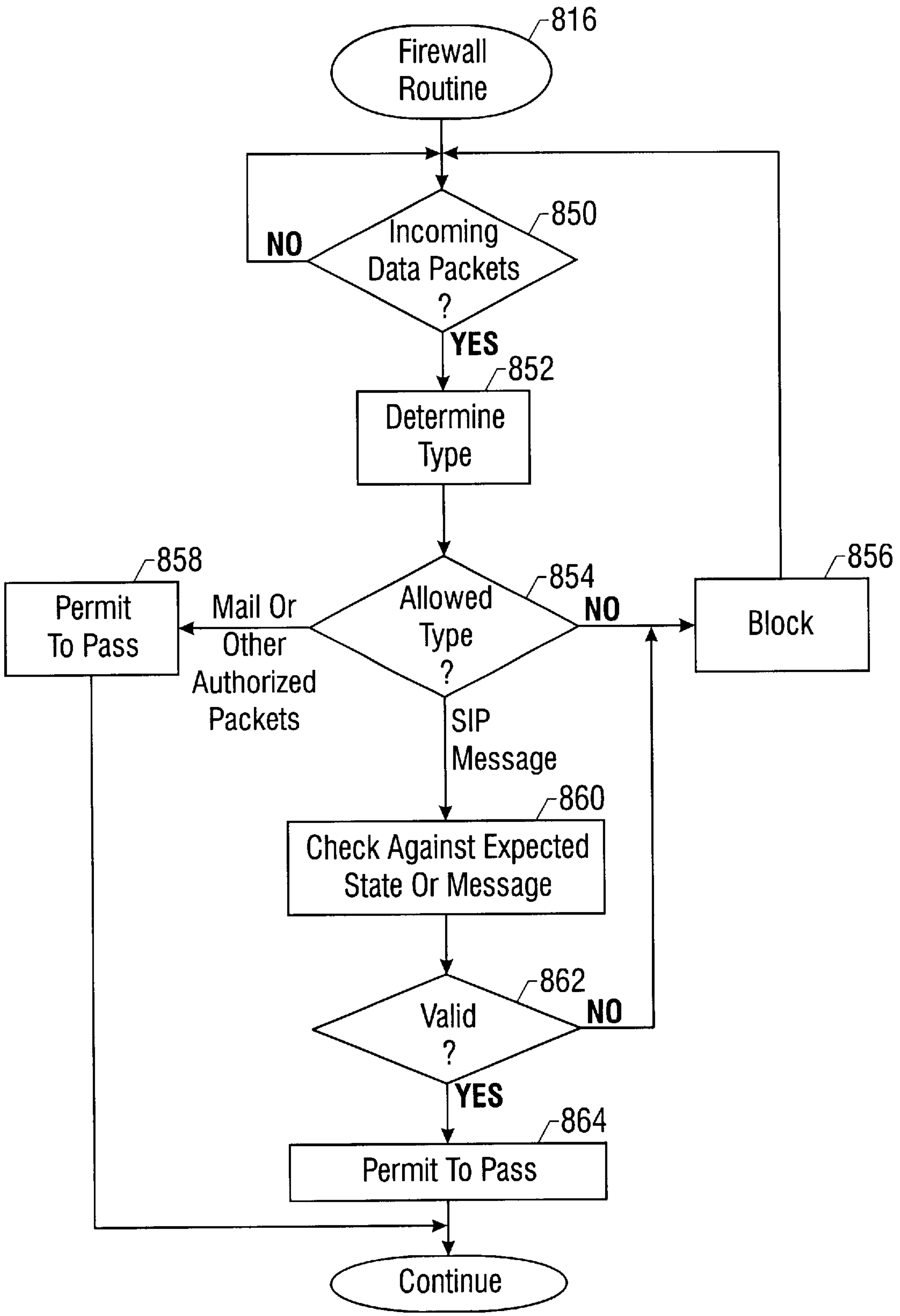
FIG. 14 is a flow diagram of a process performed by the firewall system of FIG. 4.

Referring to FIG. 14, the process performed by the firewall routine 816 (FIG. 4) in the firewall system is generally described. The firewall routine 816 first determines if incoming data packets have been received (at 850) from the external network 51. If so, the type or types of the data packets is determined (at 852). The firewall routine 816 next determines if the type is allowed (at 854). If not, the data packets are blocked (at 856) from the local network 64 or 68 (FIG. 4).

Certain types of data packets may be allowed to pass though, such as e-mail packets or other types of authorized packets (such as packets from users who have performed a remote log-in). In such case, the received packets are permitted to pass through (at 858) the firewall system, If the received data packets are SIP messages, then special processing may be performed. The firewall routine 816 may check (at 860) a SIP message against the current state of the call session (if a SIP session is active). The firewall routine 816 may be tracking the progress of a particular call session and it may compare the received SIP message with whether it is consistent with the next state or expected message. For example, following an Invite request, the Ringing and OK responses are expected. Based on such a check, the firewall routine 816 determines if the received SIP message is valid (at 862). If not, the received SIP message is blocked (at 856) from passing through the firewall system. If the SIP message is valid, then the message is permitted to pass through the firewall system (at 864).

The firewall routine 816 may also be configured to accept or block SIP Info messages communicated outside an established SIP session. In one arrangement, SIP Info messages may be generally blocked unless they originated from a network element that has properly logged in. In another arrangement, all SIP Info messages may be allowed to pass through A method and apparatus is thus described for text-based communications using a protocol that provides for real-tie interaction call sessions (e.g. SIP). Text messages exchanged in the text-based communications may occur outside an audio-based established call session or within an audio-based established call session. In one embodiment, SIP Info messages may be used to carry the text messages. Advantages of using the SIP Info message is convenient access through firewall systems. If an audio-based call session is already in progress, then a connection is already in place for text-based communications. As a result, setting up another call session for exchanging text messages is not needed between users of the audio-based call session.

As discussed above, the various network elements coupled to the data network 12 include various software layers, routines, or modules. Such software layers, routines, or modules are executable on corresponding control units. The various control units in the network elements may each include a microprocessor, a microcontroller, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various network elements may be stored in respective storage devices. The instructions when executed by a respective control unit cause the corresponding network element to perform programmed acts.

The instructions of the software routines, modules, or layers may be loaded or transported to the network element in one of many different ways. For example, code segments including instructions stored on floppy disks, CD or DVD media, a hard disk, or transported through a network interface card, modem, or other interface device may be loaded into the system and executed as corresponding software routines, modules, or layers. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of providing a text-based chat session over a data network, comprising:

establishing an audio-based call session between a first network element and another network element over the data network, the audio-based call session associated with at least one signaling path; and communicating a text-based chat message over the at least one signaling path in the data network during the audio-based call session, wherein communicating the text-based chat message includes embedding the text-based chat message in a Session Initiation Protocol message.

2. The method of claim 1, further comprising communicating audio streaming data during the audio-based call session.

3. The method of claim 2, further comprising communicating video data during the audio-based call session.

4. The method of claim 1, further comprising displaying a received text-based chat message.

5. The method of claim 1, wherein establishing the audio-based call session includes establishing a Session Initiation Protocol session.

6. The method of claim 1, further comprising providing a user interface screen including at least one selector useable for establishing the audio-based call session.

7. The method of claim 6, wherein providing the user interface screen further includes providing at least one selector for starting a text-based chat session.

8. The method of claim 1, wherein communicating the Session Initiation Protocol message comprises communicating a Session Initiation Protocol Info message.

9. A method of providing a text-based communications session over a data network, comprising:

creating one or more messages according to a protocol for establishing audio-based call sessions, wherein creating the one or more messages includes creating one or more Session Initiation Protocol messages;

receiving a user-entered text string;

embedding the user-entered text string in the one or more Session Initiation Protocol messages, wherein each of the one or more Session Initiation Protocol messages has a header portion and a body portion, the header portion defined according to the protocol providing for audio-based call sessions and the body portion containing the user-entered text string; and sending the one or more messages over the data network to a target network element.

10. The method of claim 9, wherein creating the one or more messages includes creating one or more Session Initiation Protocol Info messages.

11. The method of claim 10, wherein the one or more Info messages are communicated inside an audio-based call session.

12. The method of claim 10, wherein the one or more Info messages are communicated outside an audio-based call session.

13. A system for the use in a packet-based network, comprising:

a user interface including at least one selector to start a text-based communications session and a portion to receive user-input text; and a controller adapted to create one or more Session Initiation Protocol messages to carry the user-input text, the user-input text embedded in the one or more Session Initiation Protocol messages.

14. The system of claim 13, wherein the one or more messages include one or more Session Initiation Protocol Info messages.

15. The system of claim 14, wherein each Info message includes a message body to carry the user-input text.

16. The system of claim 15, wherein the user-input text is in Hypertext Markup Language format.

17. The system of claim 13, wherein the controller is adapted to communicate the one or more messages outside an audio-based call session.

18. The system of claim 13, wherein the controller is adapted to communicate the one or more messages along a signaling path of an established audio-based call session.

19. The system of claim 18, wherein the user interface includes at least one selector to establish the audio-based call session.

20. The system of claim 13, wherein the user interface includes a first screen including the at least one selector and a second screen including the portion to receive user-input text.

21. The system of claim 20, wherein the second screen includes another portion to display text messages that have been communicated.

22. An article including one or more machine-readable storage media containing instructions for controlling communication over a packet-based network, the instructions when executed causing a system to:

provide a user interface containing control selectors for an audio-based call session and a text-based chat session over the data network;

establish an audio-based call session in response to selection of one or more first control selectors;

establish a text-based chat session in response to selection of one or more second control selectors; and generate Session Initiation Protocol messages to carry text data of the text-based chat session, wherein the text data of the text-based chat session is embedded in the Session Initiation Protocol messages.

23. The article of claim 22, wherein the one or more storage media contain instructions that when executed cause the system to further employ at least a signaling path of the audio-based call session for the text-based chat session.

24. The article of claim 22, wherein the Session Initiation Protocol messages include Info messages.

25. A data signal embodied in a carrier wave containing a data structure accessible by elements coupled to a packet-based network, the data structure comprising:

a header portion defined according to a protocol providing for audio based call sessions;

a body portion containing a text-based chat string, wherein the data structure is defined according to a Session Initiation Protocol message, wherein the text-based chat string is embedded in the Session Initiation Protocol message.

26. The data signal of claim 25, wherein the data structure is defined according to an Info message.

27. The data signal of claim 25, wherein the text-based chat string is in Hypertext Markup Language format.

28. A method of text-based messaging over a packet-based network, comprising:

receiving messages defined according to a Session Initiation Protocol providing for audio-based communications, the messages including text exchanged in a text-based communications session and embedded in the Session Initiation Protocol messages; and determining if the received messages are to be blocked or permitted to be transferred between a first network and a second network.

29. The method of claim 28, wherein the determining act is performed by a firewall system.

30. The method of claim 28, wherein receiving the messages includes receiving the messages along a signaling path of an audio-based call session.

31. The method of claim 30, wherein the determining act includes checking a received message against a current state of the audio-based call session.

32. A system, comprising:

interfaces to a first network and a second network; and a firewall module to control access between the first and second networks, the firewall module allowing messages according to a Session Initiation Protocol defining audio-based call sessions to be passed between the first and second networks, wherein a text-based chat message is embedded in each of the Session Initiation Protocol messages.

* * * * *